United States Patent
Kuramitsu (10) Patent No.: US 9,692,343 B2
(45) Date of Patent: Jun. 27, 2017

(54) CONTROLLER CALCULATING A DISTRIBUTION VALUE TO CONTROL ELECTRIC CURRENT FLOW

(71) Applicant: DENSO CORPORATION, Kariya, Aichi-pref. (JP)

(72) Inventor: Shuji Kuramitsu, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/043,166

(22) Filed: Feb. 12, 2016

(65) Prior Publication Data
US 2016/0241182 A1    Aug. 18, 2016

(30) Foreign Application Priority Data

Feb. 17, 2015   (JP) .................................. 2015-28670

(51) Int. Cl.
| | |
|---|---|
| G05B 5/00 | (2006.01) |
| G05D 23/00 | (2006.01) |
| H02H 7/08 | (2006.01) |
| H02P 25/22 | (2006.01) |
| H02P 29/64 | (2016.01) |
| H02P 21/06 | (2016.01) |
| H02P 29/032 | (2016.01) |

(52) U.S. Cl.
CPC .............. *H02P 25/22* (2013.01); *H02P 21/06* (2013.01); *H02P 29/032* (2016.02); *H02P 29/64* (2016.02)

(58) Field of Classification Search
CPC ........................... H02P 29/024; H02P 29/0055
USPC ......................................................... 318/472
See application file for complete search history.

(56) References Cited

U.S. PATENT DOCUMENTS

| | | | | |
|---|---|---|---|---|
| 5,414,339 A | * | 5/1995 | Masaki ................... | B60L 3/003 318/139 |
| 2013/0033210 A1 | * | 2/2013 | Suzuki ................ | H02P 29/0055 318/400.22 |
| 2014/0253009 A1 | | 9/2014 | Kimpara et al. | |
| 2015/0084570 A1 | * | 3/2015 | Hara ..................... | B62D 5/0403 318/494 |

\* cited by examiner

*Primary Examiner* — Erick Glass
(74) *Attorney, Agent, or Firm* — Knobbe, Martens, Olson & Bear, LLP (57) ABSTRACT

A controller controls a rotating electric machine that has a plurality of winding wire groups, by using an instruction calculator, a temperature calculator, a distributor, and an electric current control section. The instruction calculator calculates an assist instruction value regarding a drive of the machine. The machine has systems each having a combination of a winding wire group and an inverter. The distributor distributes the assist instruction value among the winding wire groups according to system temperatures, for the calculation of torque instruction values for the respective winding wire groups. In such manner, an overheat of the machine and the inverters is prevented.

9 Claims, 8 Drawing Sheets

CONTROLLER CALCULATING A DISTRIBUTION VALUE TO CONTROL ELECTRIC CURRENT FLOW

CROSS REFERENCE TO RELATED APPLICATION

The present application is based on and claims the benefit of priority of Japanese Patent Application No. 2015-028670, filed on Feb. 17, 2015, the disclosure of which is incorporated herein by reference.

TECHNICAL FIELD

The present disclosure generally relates to a controller for driving a rotating electric machine.

BACKGROUND INFORMATION

Conventionally, the electric power steering device having a motor as its source of driving power is known. For example, as disclosed in a patent document, JP 2013-153619 A (Patent document 1), an electric power steering device has a first inverter for applying a voltage to a first winding wire and a second inverter for applying a voltage to a second winding wire, and a voltage applied to the second finding wire is controlled based on a deviation of the electric currents (i.e., a difference between an electric current supplied to the first winding wire, and an electric current supplied to the second winding wire).

When, in such case, there are two or more systems of winding wires and/or inverters, heat generation state may be different from system to system, causing a system to overheat. However, no consideration is made in the patent document 1 regarding an unevenness of heat generation among plural systems.

SUMMARY

It is an object of the present disclosure to provide a controller of a rotating electric machine that prevents an overheat.

In an aspect of the present disclosure, the controller for controlling a rotating electric machine that has a plurality of winding wire groups includes an instruction calculator, a temperature calculator, a distributor, and an electric current control section.

The instruction calculator calculates an instruction value regarding a drive of the rotating electric machine.

A system has a combination of a winding wire group and an inverter corresponding to the system. The temperature calculator calculates a system temperature for each of the systems.

The distributor calculates, for each of the winding wire groups, a distributed instruction value by distributing the instruction value calculated by the instruction calculator, according to the system temperature.

The electric current control section controls an electric current flowing in each of the winding wire groups, based on the distributed instruction value.

According to the present embodiment, the instruction value is distributed according to the system temperature, for the calculation of the distributed instruction value for each of the winding wire systems, thereby preventing or reducing an overheat of the rotating electric machine and the inverter.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, the control device by the present disclosure is described based on the drawings. In the following embodiments, like parts have like numbers, and description of the like parts is not repeated.

(First Embodiment)

The controller in the first embodiment of the present disclosure is described based on FIGS. 1-4.

Figure 1:
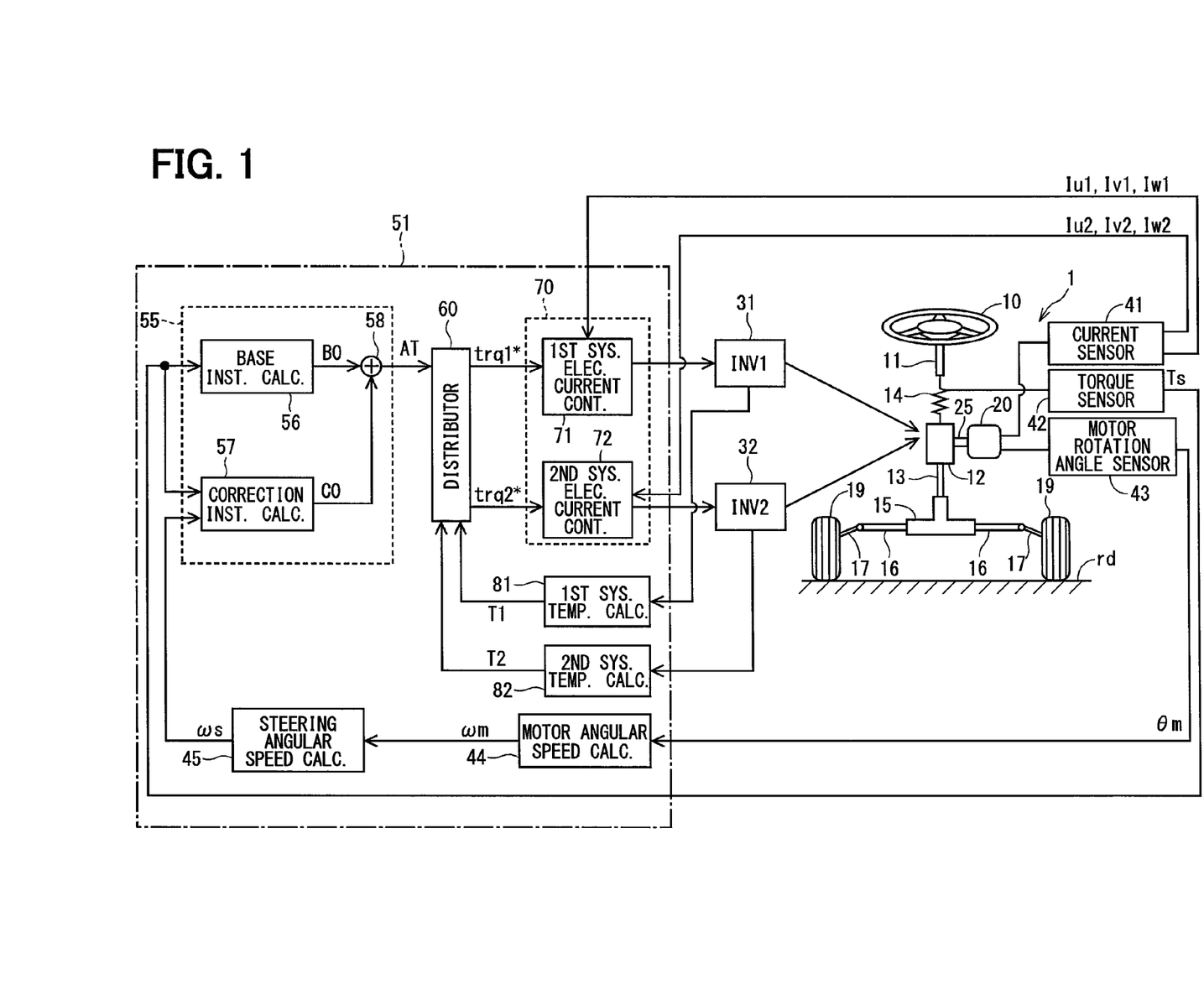
FIG. 1 is a block diagram of a controller in a first embodiment of the present disclosure.

A controller 51 of the present embodiment controls the drive of a motor 20 (i.e., a rotating electric machine), used in an electric power steering system 1 as shown in FIG. 1.

The electric power steering system 1 includes a steering wheel 10 as a steering member, an input shaft 11, a column shaft 12, an intermediate shaft 13, a torsion bar 14, the motor 20, a gear 25, a steering device 15, a current sensor 41, a torque sensor 42, a motor rotation angle sensor 43 (which may simply be designated hereafter as a "rotation angle sensor"), and the like.

The steering wheel 10 steered by the driver is connected with one end of the input shaft 11. The input shaft 11 is connected with the column shaft 12 by the torsion bar 14.

The column shaft 12 is connected with an opposite end of the input shaft 11 (i.e., an end opposite to the steering wheel 10 connected end of the input shaft 11) by the torsion bar 14. The motor 20 is connected with the column shaft 12 via the gear 25. The torque that is output from the motor 20 is transmitted to the column shaft 12 via the gear 25 as an assist torque, and such a torque assists a rotation of the column shaft 12. That is, the electric power steering system 1 of the present embodiment is of a column assist type, where the rotation of the column shaft 12 is assisted by the assist torque of the motor 20. However, not only the column assist type, but also a rack assist type of electric power steering system may also be applicable to the present disclosure.

The intermediate shaft 13 connects the column shaft 12 and the steering device 15, and transmits the rotation of the column shaft 12 to the steering device 15.

The steering device 15 is constituted by a rack and pinion mechanism having a rack and pinion (not illustrated), and converts a rotation of the column shaft 12 transmitted via the intermediate shaft 13 into a translational reciprocal movement of the rack. A tie rod 16 is provided on both ends of the rack. The tie rod 16 moves reciprocally to the right and to the left with the rack (i.e., pulls and pushes a knuckle arm 17 provided at a position between the tie rod 16 and a wheel 19). Thereby, the wheel 19, which contacts a road surface rd, is steered.

Figure 2:
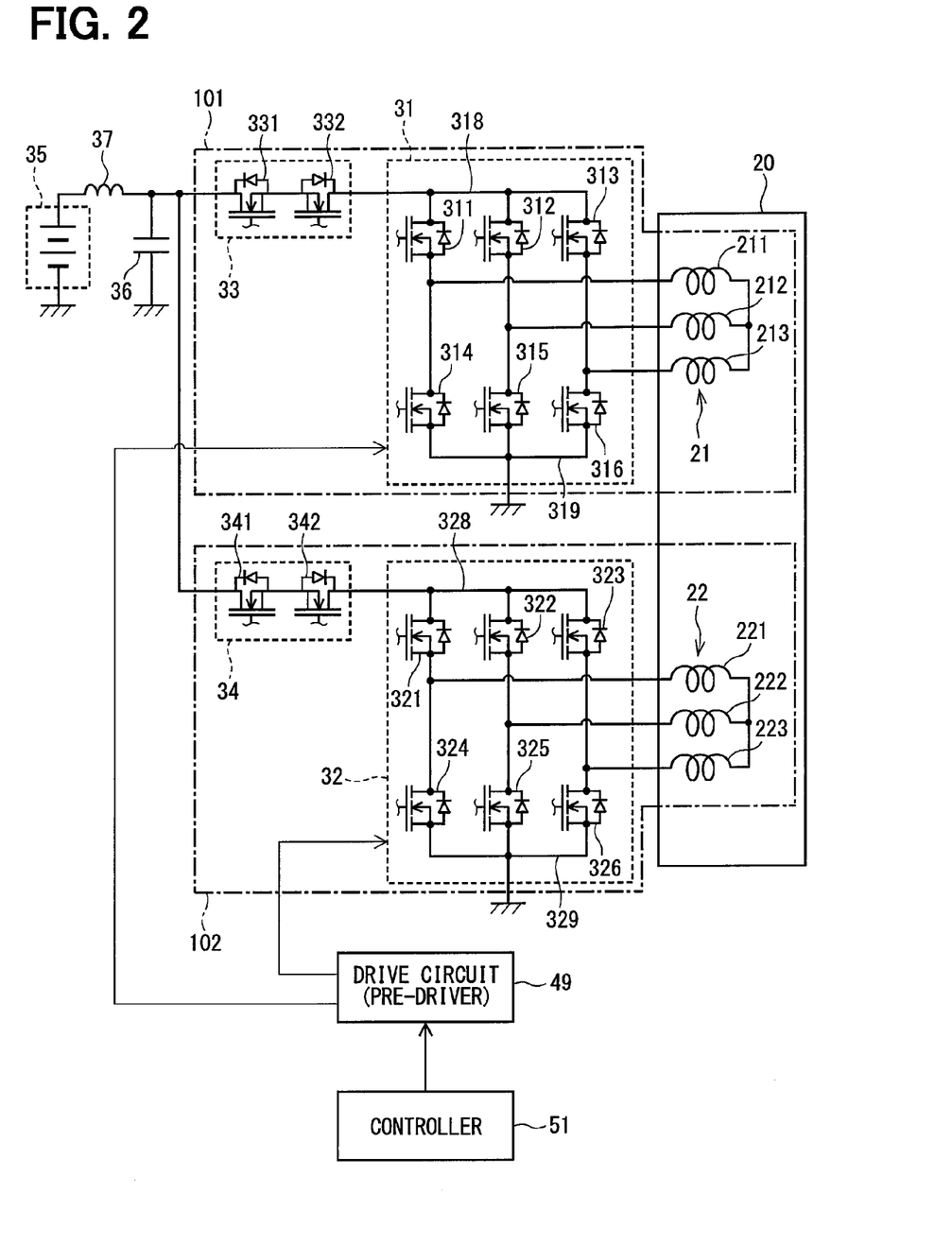
FIG. 2 is a circuit diagram of a motor and an inverter in the first embodiment of the present disclosure.

As shown in FIG. 2, the motor 20 is the electric motor of three-phase alternating current, and has the rotor and stator (not illustrated). The stator has two systems of winding wires wound on the stator (i.e., a first system winding wire group 21 and a second system winding wire group 22 are wound on the stator).

The first system winding wire group 21 comprises a U1 coil 211, a V1 coil 212, and a W1 coil 213. The second system winding wire group 22 comprises a U2 coil 221, a V2 coil 222, and a W2 coil 223.

A first inverter 31 has six switching elements 311-316, and switches the power supply to the first system winding wire group 21.

The drain of each of the high potential side switching elements 311, 312, and 313, which are the switching elements provided on the high potential side, is connected with a positive electrode of a battery 35 via a high side bus line 318. The source of each of the high potential side switching elements 311, 312, and 313 is connected with the drain of the low potential side switching elements 314, 315, and 316, which are the switching elements provided on the low potential side.

The source of each of the low potential side switching elements 314, 315, and 316 is connected with the ground via a low side bus line 319. The junction point between a pair of the switching elements (i.e., junction points of three pairs of the high potential side switching elements 311, 312, 313 and the low potential side switching elements 314, 315, 316) are respectively connected with an end of the U1 coil 211, an end of the V1 coil 212, and an end of the W1 coil 213.

A second inverter 32 has six switching elements 321-326, and switches the power supply to the second system winding wire group 22.

The drain of each of the high potential side switching elements 321, 322, and 323, which are the switching elements provided on the high potential side is connected with the positive electrode of the battery 35 via a high side bus line 328. The source of each of the high potential side switching elements 321, 322, and 323 is connected with the drain of the low potential side switching elements 324, 325, and 326, which are the switching elements provided on the low potential side.

The source of each of the low potential side switching elements 324, 325, and 326 is connected with the ground via a low side bus line 329. The junction point between a pair of the switching elements (i.e., junction points of three pairs of the high potential side switching elements 321, 322, 323 and the low potential side switching elements 324, 325, 326) are respectively connected with an end of the U2 coil 221, an end of the V2 coil 222, and an end of the W2 coil 223.

A relay 33 is provided on the high side bus line 318. The relay 33 consists of a power relay 331 and a reverse connection protection relay 332. The power relay 331 conducts or intercepts the electric current between the first inverter 31 and the battery 35. The reverse connection protection relay 332 is provided at a position between the first inverter 31 and the power relay 331.

A relay 34 is provided on the high side bus line 328. The relay 34 consists of a power relay 341 and a reverse connection protection relay 342. The power relay 341 conducts or intercepts the electric current between the second inverter 32 and the battery 35. The reverse connection protection relay 342 is provided at a position between the second inverter 32 and the power relay 341.

Although the switching elements 311-316, 321-326 and relays 331, 332, 341, and 342 are all implemented as a Metal Oxide Semiconductor Field Effect Transistor (MOSFET), other kinds of elements may also be usable such as an Insulated Gate Bipolar Transistor (IGBT) and the like.

The reverse connection protection relays 332 and 342 are connected in reverse, relative to the respective power relays 331 and 341. Such a configuration provides protection for the electronic components such as the first inverter 31, the second inverter 32 and the like, by preventing a reverse electric current to flow to those inverters 31, 32 and the like when, for example, the battery 35 is connected in reverse to the circuit.

A capacitor 36 and a choke coil 37 are provided at a position between (i) the first inverter 31 and the second inverter 32, and (ii) the battery 35. The capacitor 36 and the choke coil 37 serve as a filter circuit, reducing the noise transmitted to and from the other device that shares the same battery 35 (i.e., the device such as the motor 20, the inverters 31 and 32 and the like).

As shown in FIG. 1, the current sensor 41 detects the electric current supplied to each phase of the two winding wire groups (i.e., a U1 electric current Iu1, a V1 electric current Iv1, and a W1 electric current Iw1 supplied to the phases of the first system winding wire group 21; and a U2 electric current Iu2, a V2 electric current Iv2, and a W2 electric current Iw2 supplied to the phases of the second system winding wire group 22).

Hereafter, the U1 electric current Iu1, the V1 electric current Iv1, the W1 electric current Iw1; and the U2 electric current Iu2, the V2 electric current Iv2, and the W2 electric current Iw2 may also be designated as phase currents Iu1, Iv1, Iw1; and Iu2, Iv2, and Iw2.

The torque sensor 42 detects a torsion torque based on a twist angle of the torsion bar 14. According to the present embodiment, the torsion torque detected by the torque sensor 42 is designated as "a steering torque Ts."

The rotation angle sensor 43 detects a motor rotation angle θm which is the rotation angle of the motor 20. According to the present embodiment, the motor rotation angle θm is considered as a mechanical angle.

Detection signals concerning the phase currents Iu1, Iv1, Iw1, Iu2, Iv2, and Iw2 that are detected by the current sensor 41, a detection signal concerning the steering torque Ts detected by the torque sensor 42, and a detection signal concerning the motor rotation angle Om detected by the rotation angle sensor 43 are outputted to the controller 51.

As shown in FIGS. 1 and 2, the controller 51 manages a control of the motor 20, and is provided as a microprocessor or the like to perform various operations and calculations by using Central Processing Unit (CPU), Read-Only Memory (ROM), Random-Access Memory (RAM), Input/Output (I/O), and the bus line that connects these elements, etc., in the microprocessor.

Each of many processes in the controller 50 may be a software process by an execution of a pre-memorized program by CPU, or may be a hardware process provided by an electronic circuit dedicated for such process.

The controller 51 generates a control signal that controls switching ON and OFF of the switching elements 311-316, 321-326 based on the detection values and the like from the current sensor 41, the torque sensor 42, the rotation angle sensor 43, etc. The generated control signal is outputted to the gate of the switching elements 311-316, 321-326 via a drive circuit (i.e., a pre-driver) 49.

Further, the controller 51 controls an ON-OFF operation of the relays 331, 332, 341, and 342. In FIG. 2, for the ease of the reading of the drawing, control lines connected to the relays 331, 332, 341, and 342 are omitted from the drawing. Further, in FIGS. 1, 3 and other drawing, the drive circuit 49 is not illustrated.

According to the present embodiment, the first system winding wire group 21, the first inverter 31, and the relay 33 serve as "a first system 101," and the second system winding wire group 22, the second system inverter 32, and the relay 34 serve as "a second system 102."

Figure 3:
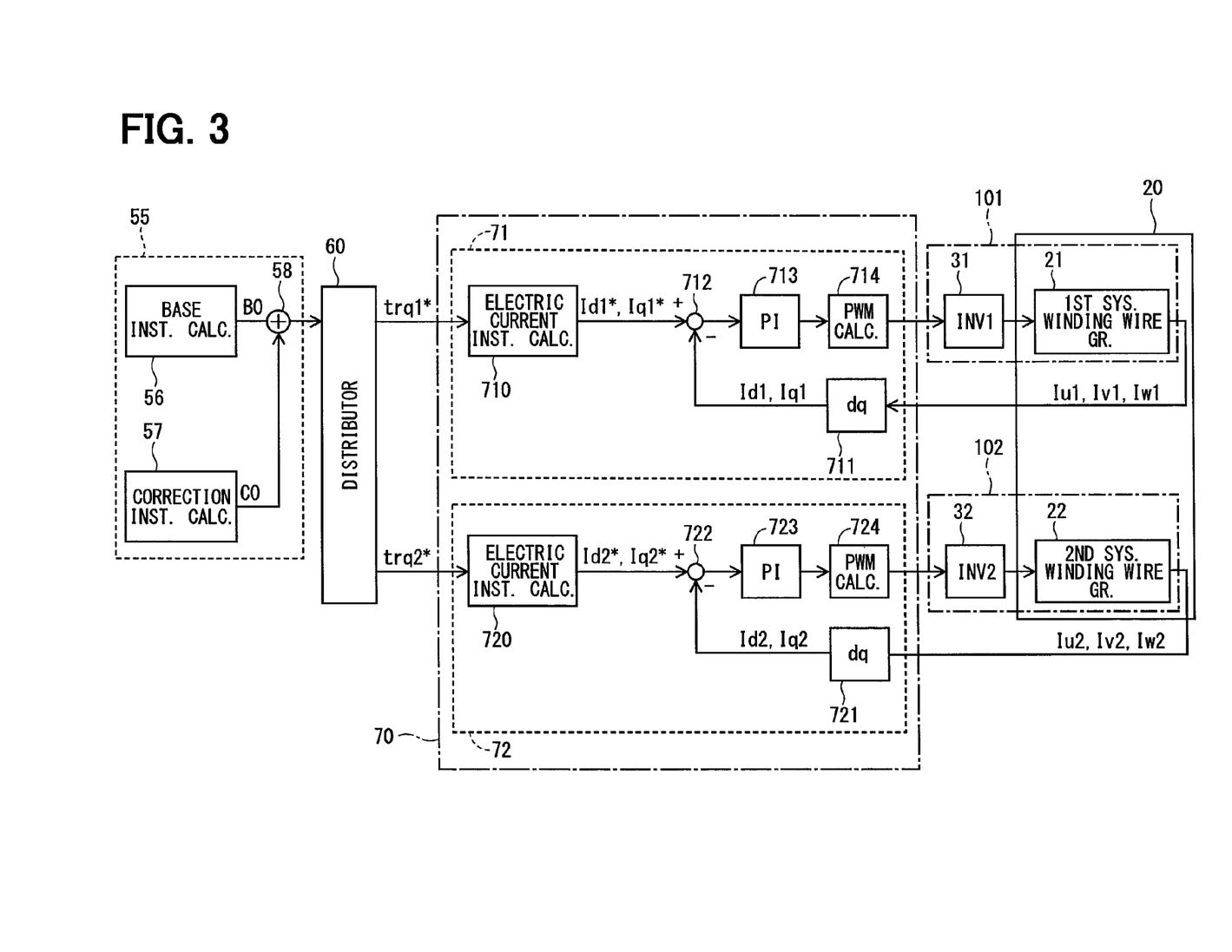
FIG. 3 is a block diagram of an electric current control section in the first embodiment of the present disclosure.

As shown in FIGS. 1 and 3, the controller 51 has a motor angular speed calculator 44, a steering angular speed calculator 45, an instruction calculator 55, a distributor 60, an electric current control section 70, a first system temperature calculator 81, a second system temperature calculator 82, and the like.

The motor angular speed calculator 44 calculates a motor angular speed ωm based on a motor rotation angle θm.

The steering angular speed calculator 45 converts the motor angular speed ωm to a steering angular speed ωs based on the gear ratio of the gear 25, etc.

The instruction calculator 55 has a base instruction calculator 56, a correction instruction calculator 57, and an adder 58.

The base instruction calculator 56 and the correction instruction calculator 57 perform calculation by using, for example, at least a part of a vehicle speed, a steering wheel angle, and the motor rotation angle θm, the motor angular speed ωm, the steering angular speed ωs, together with other parameters.

The base instruction calculator 56 calculates a base instruction value B0 according to the steering torque Ts.

The correction instruction calculator 57 calculates a correction instruction value C0 for correcting the base instruction value B0. The correction instruction value C0 may be, for example, calculated as a value for a control for improving a convergence of the steering operation, a control regarding a vehicle motion and the like. In the present embodiment, the correction instruction calculator 57 is described as one function block. However, such a configuration may be changed for, for example, calculating a correction instruction value for each of those controls.

The adder 58 adds the base instruction value B0 and the correction instruction value C0, for calculating an assist instruction value AT.

The distributor 60 distributes the assist instruction value AT based on a first system temperature T1 calculated by the first system temperature calculator 81 and a second system temperature T2 calculated by the second system temperature calculator 82, and calculates a first system torque instruction value trq1* and a second system torque instruction value trq2*. Details of the first system torque instruction value trq1* and the second system torque instruction value trq2* are described in the following. In the present embodiment, the assist instruction value AT corresponds to an "instruction value," and the first system torque instruction value trq1* and the second system torque instruction value trq2* respectively correspond to a "distributed instruction value."

The electric current control section 70 has a first system electric current control section 71 and a second system electric current control section 72, and controls the electric current which flows to the winding wire groups 21 and 22.

As shown in FIG. 4, the first system electric current control section 71 has an electric current instruction calculator 710, a Direct and Quadrature (dq) converter 711, a subtracter 712, a PI calculator 713, and a Pulse Width Modulation (PWM) calculator 714, and generates a control signal concerning a control of the electric current that flows to the first system winding wire group 21.

The electric current instruction calculator 710 calculates a d axis electric current instruction value Id1* and a q axis electric current instruction value Iq1* of the first system 101 by performing a map calculation etc., based on the first system torque instruction value trq1*.

The dq converter 711 performs a dq conversion of the phase currents Iu1, Iv1, and Iw1 detected by the current sensor 41 (i.e., see FIG. 1, the sensor 41 is omitted from FIG. 3), and calculates a d axis electric current detection value Id1 and a q axis electric current detection value Iq1 of the first system 101.

The subtracter 712 calculates a d axis electric current deviation ΔId1, which is a deviation of the d axis electric current instruction value Id1* from the d axis electric current detection value Id1 coming from feedback, and calculates a q axis electric current deviation ΔIq1, which is a deviation of the q axis electric current instruction value Iq1* from the q axis electric current detection value Iq1 coming from feedback.

The PI calculator 713 calculates voltage instruction values Vd1* and Vq1* by performing a PI calculation etc., so that the electric current deviations ΔId1 and ΔIq1 respectively converge to zero. The calculated voltage instruction values Vd1* and Vq1* are converted to voltage instruction values Vu1*, Vq1*, and Vw1* in three phases.

The PWM calculator 714 compares the voltage instruction values Vu1*, Vv1*, and Vw1* in three phases with a carrier wave, and generates a control signal that controls switching ON and OFF of the switching elements 311-316. The generated control signal is outputted to the first inverter 31 via the drive circuit 49 (refer to FIG. 2). In such manner, the power supply to the first system winding wire group 21 is controlled.

The second system electric current control section 72 has an electric current instruction calculator 720, a dq converter 721, a subtracter 722, a PI calculator 723, and a PWM calculator 724, and generates a control signal concerning a control of the electric current which flows to the second system winding wire group 22.

The electric current instruction calculator 720 calculates a d axis electric current instruction value Id2* and a q axis electric current instruction value Iq2* of the second system 102 by performing a map calculation etc., based on the second system torque instruction value trq2*.

The dq converter 721 performs a dq conversion of the phase currents Iu2, Iv2, and Iw2 detected by the current sensor 41, and calculates a d axis electric current detection value Id2 and a q axis electric current detection value Iq2 of the second system 102.

The subtracter 722 calculates a d axis electric current deviation ΔId2, which is a deviation of the d axis electric current instruction value Id2* from the d axis electric current detection value Id2 coming from feedback, and calculates a q axis electric current deviation ΔIq2, which is a deviation of the q axis electric current instruction value Iq2* from the q axis electric current detection value Iq2 coming from feedback.

The PI calculator 723 calculates voltage instruction values Vd2* and Vq2* by performing a PI calculation etc., so that the electric current deviations ΔId2 and ΔIq2 respectively converge to zero. The calculated voltage instruction values Vd2* and Vq2* are converted to voltage instruction values Vu2*, Vv2*, and Vw2* in three phases.

The PWM calculator 724 compares the voltage instruction value Vu2*, Vv2*, and Vw2* in three phases with a carrier wave, and generates a control signal that controls switching ON and OFF of the switching elements 321-326. The generated control signal is outputted to the second system inverter 32 via the drive circuit 49 (see FIG. 2). In such manner, the power supply to the second system winding wire group 22 is controlled.

The responsiveness of the first system electric current control section 71 and the responsiveness of the second system electric current control section 72 may be equal to each other, or may be different from each other. In other words, the control parameter that determines the frequency response may be the same value in both of the first system electric current control section 71 and the second system electric current control section 72, or may be different in the two sections 71, 72.

When the responsiveness of the electric current control is different in the two sections 71, 72, the first system electric current control section 71 may have a low range response (i.e., low frequency or low sensitivity response), which is a minimum degree of electric current response barely realizing the instruction value, and the second system electric current control section 72 may have a high range response reaching to a higher degree of electric current response (i.e., low frequency or low sensitivity response), for example. By setting one of the first system electric current control section 71 and the second system electric current control section 72 to have a low range response, and by setting the other to have a high range response, the vibration and/or the noise is reduced compared to when both sections have a high range response setting.

Further, in the first system electric current control section 71 and the second system electric current control section 72, a non-interference control that reduces interference between the two systems may be performed.

Returning to FIG. 1, the first system temperature calculator 81 calculates the first system temperature T1, which is the temperature of the first system 101.

The first system temperature T1 may be the temperature of switching elements 311-316 of the first inverter 31, the temperature of the first system winding group 21, or the temperature of a motor line that connects the first system winding group 21 and the first inverter 31, for example.

The first system temperature T1 may be calculated based on a detection value of a temperature sensor (not illustrated), or may be estimated based on the phase currents Iu1, Iv1, and Iw1.

The second system temperature calculator 82 calculates the second system temperature T2, which is the temperature of the second system 102.

The second system temperature T2 may be the temperature of switching elements 321-326 of second inverter 32, the temperature of the second system winding group 22, or the temperature of a motor line that connects the second system winding group 22 and second inverter 32, for example.

The second system temperature T2 may be calculated based on a detection value of the temperature sensor (not illustrated), or may be estimated based on phase currents Iu2, Iv2, and Iw2.

The phase currents Iu1, Iv1, Iw1, Iu2, Iv2, and Iw2 used for the estimation of the system temperature may be detection values, or may be instruction values.

Further, in FIG. 1, the temperature calculators 81 and 82 are indicated by calculating the temperature of the inverters 31 and 32. The same may apply to FIG. 5 mentioned in the following.

Further, in the first system 101, when the temperature of two or more positions (e.g., each of the switching elements 311-316) is detected or estimated, the first system temperature T1 may be the highest temperature detected or estimated. Furthermore, instead of using the highest temperature detected or estimated, the average temperature may be used. The same applies to the second system temperature T2.

The first system temperature T1 and the second system temperature T2 are outputted to the distributor 60.

Here, a calorific value Q is represented with an equation (1).

R in the equation is the resistance and I is the electric current.

$$Q = R \times I^2 \qquad \text{Equation (1)}$$

Since the calorific value Q is proportional to the square of the electric current I, it is important for reducing the calorific value Q to decrease the electric current I, as shown in the equation (1).

According to the present embodiment, for preventing the uneven heat generation among the two systems and for preventing an overheat of the one system, the assist instruction value AT is distributed according to the first system temperature T1 and the second system temperature T2.

Figure 4:
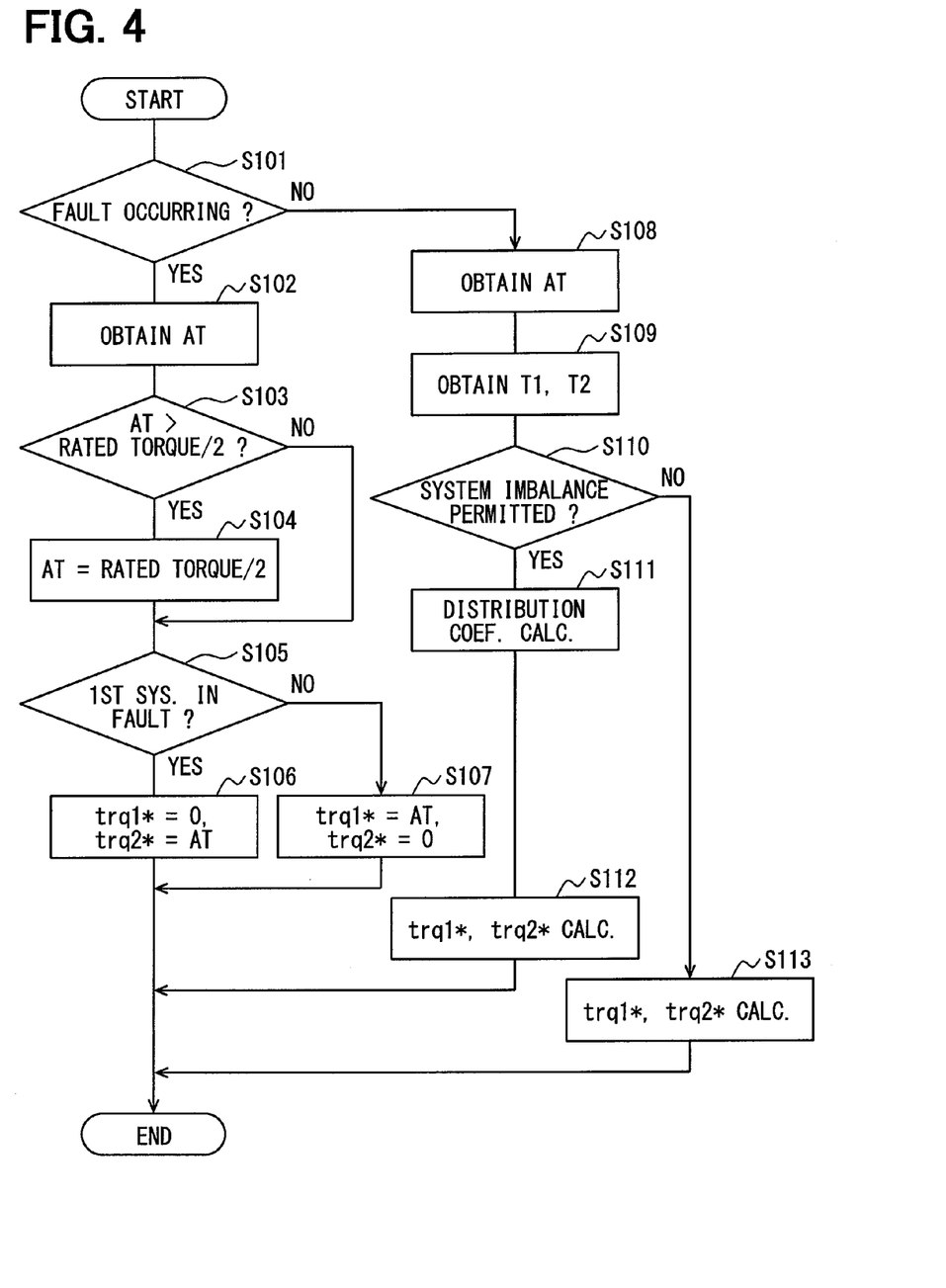
FIG. 4 is a flowchart of a distribution process in the first embodiment of the present disclosure.

The distribution process in the present embodiment is described based on the flowchart shown in FIG. 4. The distribution process is performed at predetermined intervals by the distributor 60.

In step S101 (hereafter, a "step" is replaced with a sign "S"), it is determined whether a fault of one of the two systems occurs. When it is determined that a fault has not occurred (S101:NO), the process proceeds to S108. When it is determined that a fault has occurred (S101:YES), the process proceeds to S102.

In S102, an assist instruction value AT is obtained.

In S103, it is determined whether the assist instruction value AT is greater than one half of a rated torque of the motor 20. When the assist instruction value AT is determined to be ½ or less of the rated torque (S103:NO), the process proceeds to S105. When the assist instruction value AT is determined to be greater than one half of the rated torque (S103:YES), the process proceeds to S104.

In S104, since the first system 101 or the second system 102 which has a fault cannot be used, the assist instruction value AT is restricted to one half of the rated torque.

In S105, it is determined whether the system having a fault is the first system 101 or not. In the flowchart, the first system 101 is designated as "1st system." When it is determined that the system having a fault is the first system 101 (S105:YES), the process proceeds to S106. When it is determined that the system having a fault is not the first system 101 (i.e., when the system having a fault is the second system 102) (S105:NO), the process proceeds to S107.

In S106, the first system torque instruction value trq1* and the second system torque instruction value trq2* are calculated. In this case, the first system torque instruction value trq1* concerning the first system 101 having a fault is set to zero, and the second system torque instruction value trq2* is set to the assist instruction value AT. That is, the first system torque instruction value trq1* and the second system torque instruction value trq2* are represented by equations (2-1) and (2-2).

$$trq1^* = \qquad \text{Equation (2-1)}$$

$$trq2^* = AT \qquad \text{Equation (2-2)}$$

In S107, the first system torque instruction value trq1* and the second system torque instruction value trq2* are calculated. Here, the second system torque instruction value trq2* concerning the second system 102 having a fault is set to zero, and the first system torque instruction value trq1* is set to the assist instruction value AT. That is, the first system torque instruction value trq1* and the second system torque instruction value trq2* are represented by equations (3-1) and (3-2).

$$trq1^* = AT \qquad \text{Equation (3-1)}$$

$$trq2^* = 0 \qquad \text{Equation (3-2)}$$

In S108, which comes after a determination that a fault has not occurred (S101:NO), the assist instruction value AT is obtained just like S102.

In S109, the first system temperature T1 and the second system temperature T2 are obtained.

In S110, it is determined whether system imbalance is permitted.

When it is determined that system imbalance is not permitted (S110:NO), the process proceeds to S113. When it is determined that system imbalance is permitted (S110: YES), the process proceeds to S111.

In S111, distribution coefficients K1, K2 for the two systems are calculated. The distribution coefficient K1 for the first system 101 and the distribution coefficient K2 for the second system 102 are represented by equations (4-1) and (4-2). Further, the distribution coefficients K1 and K2 may also be calculated by equations other than the equations (4-1), (4-2), or by using a map or the like.

$$K1 = T2/(T1+T2) \qquad \text{Equation (4-1)}$$

$$K2 = T1/(T1+T2) \qquad \text{Equation (4-2)}$$

In S112, the first system torque instruction value trq1* and the second system torque instruction value trq2* are calculated. The first system torque instruction value trq1* and the second system torque instruction value trq2* are represented by equations (5-1) and (5-2).

$$trq1^* = AT \times K1 \qquad \text{Equation (5-1)}$$

$$trq2^* = AT \times K2 \qquad \text{Equation (5-2)}$$

In S113, which comes after a determination that system imbalance is not permitted (S110:NO), the assist instruction value AT is evenly distributed among two systems, and the first system torque instruction value trq1* and the second system torque instruction value trq2* are calculated. Here, both of the first system torque instruction value trq1* and the second system torque instruction value trq2* are set to one half of the assist instruction value AT. That is, the first system torque instruction value trq1* and the second system torque instruction value trq2* are represented by equations (6-1) and (6-2).

$$trq1^* = AT/2 \qquad \text{Equation (6-1)}$$

$$trq2^* = AT/2 \qquad \text{Equation (6-2)}$$

For example, when the first system temperature T1=60[° C.] and the second system temperature T2=40[° C.], the distribution coefficient K1=0.4 and the distribution coefficient K2=0.6 according to the equations (4-1) and (4-2). Further, according to the equations (5-1) and (5-2), the first system torque instruction value trq1* regarding the first system 101 which has a relatively high temperature is smaller than the second system torque instruction value trq2* regarding the second system 102 which has a relatively low temperature. That is, when T1>T2, the coefficients are set as K1<K2, and thus the torques become trq1*<trq2*. Thereby, the supply of the electric power to the first system 101 is decreased.

According to the present embodiment, since the torque instruction values trq1* and trq2* are calculated so that an amount of supply of the electric power to the high-temperature system is reduced according to the torque instruction values trq1* and trq2*, an overheat of the motor 20 and the inverters 31, 32 is prevented.

As described in full details above, the controller 51 controls the motor 20 having plural winding groups 21 and 22, and is provided with the instruction calculator 55, the temperature calculators 81 and 82, the distributor 60, and the electric current control section 70.

The instruction calculator 55 calculates the assist instruction value AT concerning the drive of the motor 20.

The systems 101, 102 are defined as, respectively, a combination of the winding wire group 21 and the inverter 31, and a combination of the winding wire group 22 and the inverter 32.

The temperature calculators 81 and 82 respectively calculate the system temperatures T1 and T2 of the systems 101, 102.

The distributor 60 distributes the assist instruction value AT to each of the winding wire groups 21 and 22 according to the system temperatures T1 and T2, and calculates the torque instruction values trq1* and trq2* for the respectively winding wire groups 21, 22.

The electric current control section 70 controls the electric current that flows to the winding wire groups 21 and 22 based on the torque instruction values trq1* and trq2*.

According to the present embodiment, since the assist instruction value AT is distributed according to the system temperatures T1 and T2, and the torque instruction values trq1* and trq2* are calculated based on the distributed instruction values, an overheat of the motor 20 and the inverters 31 and 32 is prevented.

The system temperatures T1 and T2 are the highest temperature among the plural positions of the winding wire groups 21, 22 and the inverters 31, 32, or the average temperature of those positions. Thereby, based on the system temperatures T1 and T2, the assist instruction value AT is appropriately distributed so as to control the torque instruction value of a system having a high temperature to have a small value.

(Second Embodiment)

Figure 5:
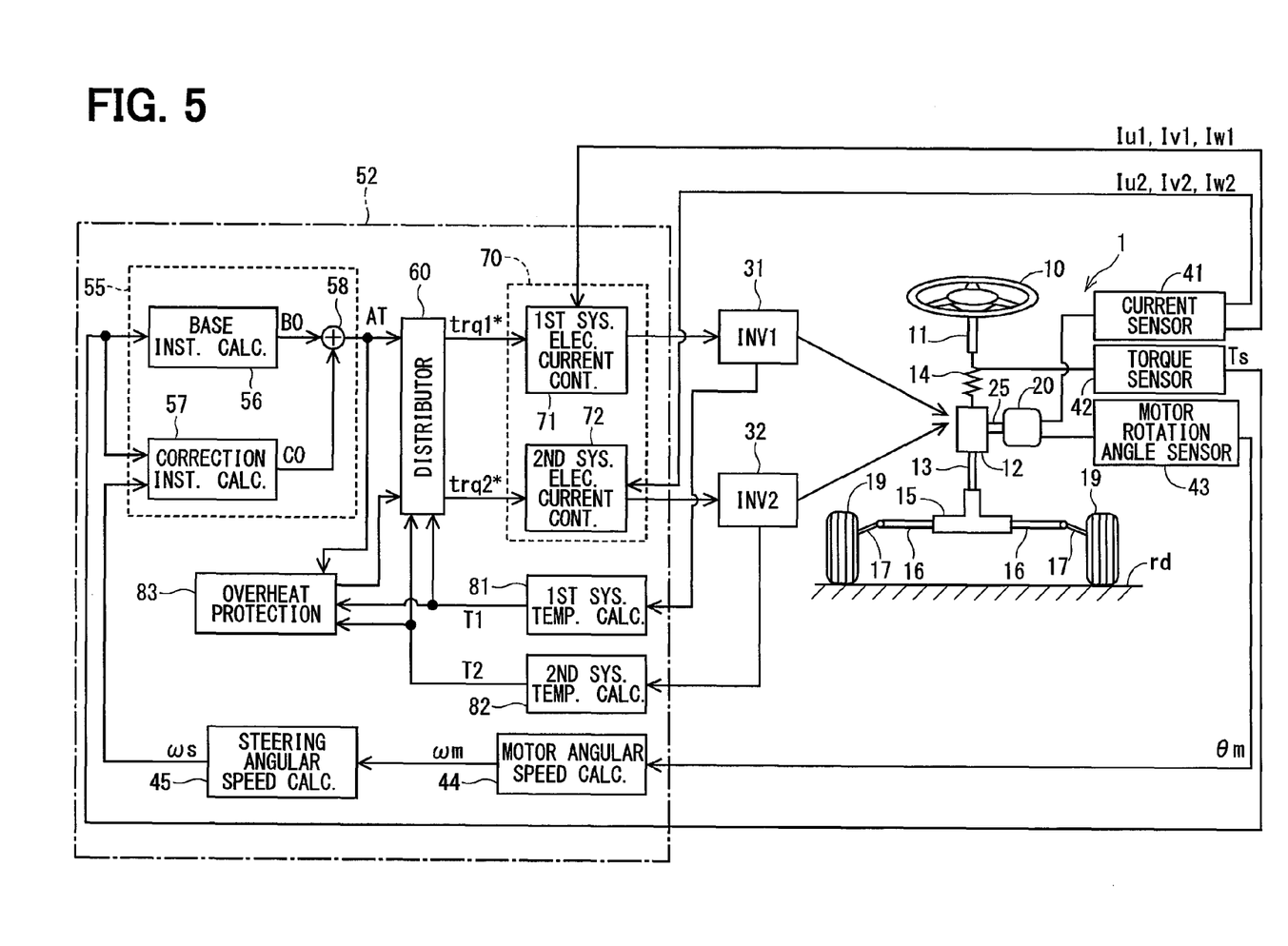
FIG. 5 is a block diagram of the controller in a second embodiment of the present disclosure.
Figure 6:
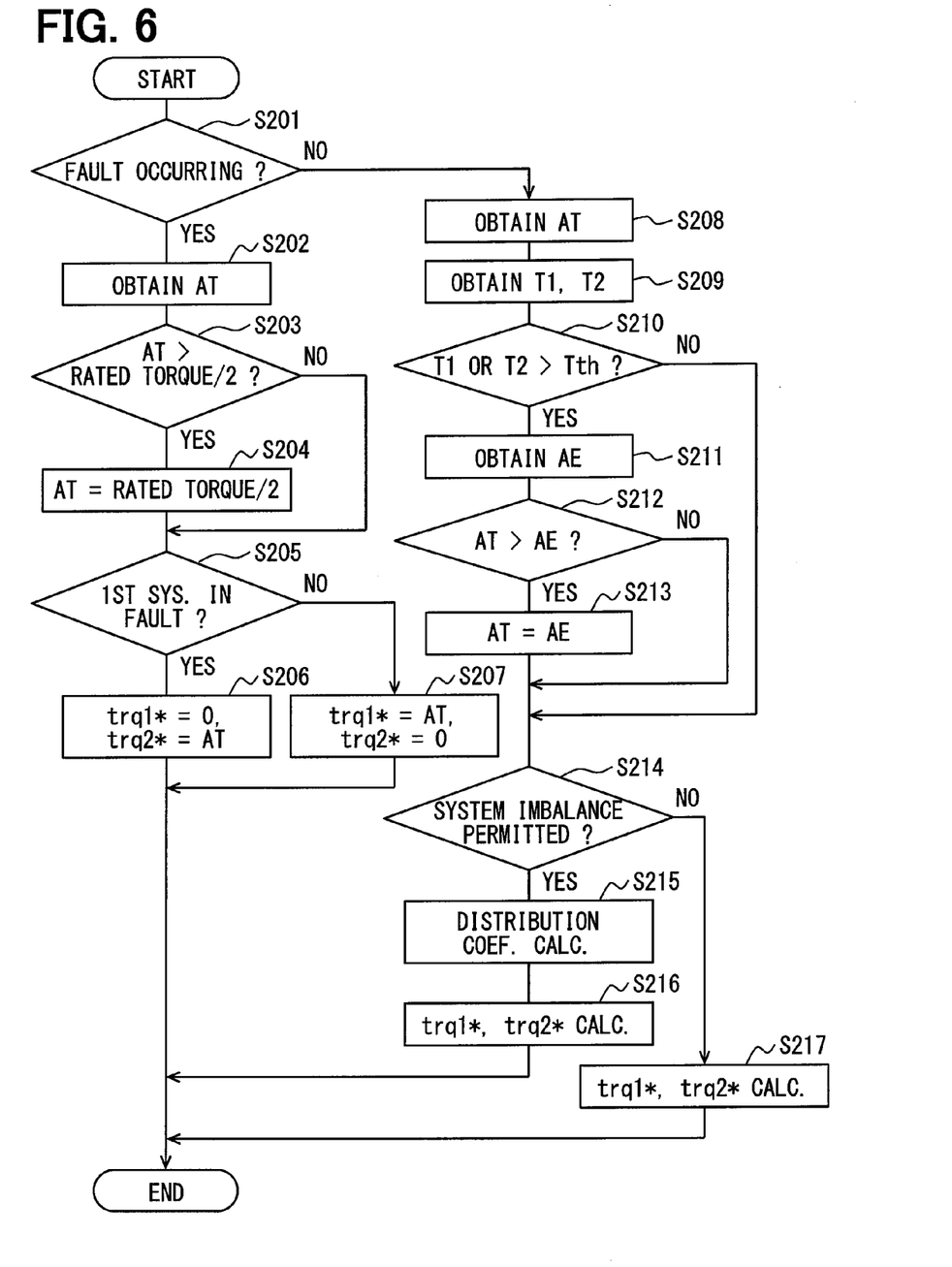
FIG. 6 is a flowchart of the distribution process in the second embodiment of the present disclosure.

The second embodiment of present disclosure is shown in FIGS. 5 and 6.

As shown in FIG. 5, a controller 52 of the present embodiment has an overheat protection section 83.

When the first system temperature T1 is higher than an overheat determination threshold value Tth, the overheat protection section 83 determines that it is in an overheat protection required state, and restricts the assist instruction value AT to an overheat protection restriction value AE.

When the second system temperature T2 is higher than the overheat determination threshold value Tth, the overheat protection section 83 determines that it is in the overheat protection required state, and restricts the assist instruction value AT to the overheat protection restriction value AE.

In the present embodiment, the overheat determination threshold value Tth is the same for both of the first system temperature T1 and the second system temperature T2.

However, the threshold value Tth for the two systems may be respectively different values.

The distribution process in the present embodiment is described based on the flowchart shown in FIG. 6. In the present embodiment, the process of S208-S213 is a process performed by the overheat protection section 83, and the other processes are processes performed by the distributor 60. Further, the process of S209 may also be performed by the distributor 60.

Further, whether the process of S208-S213 is performed by the distributor 60 or by the overheat protection section 83 may be arbitrarily determined. In other words, the distributor 60 may perform an overheat protection process. In such case, the box (i.e., a function block) of the overheat protection section 83 in FIG. 5 is contained in the distributor 60's box. The same applies to the third embodiment.

The process of S201-S207 is the same as the process of S101-S207 in FIG. 4.

In S208, the overheat protection section 83 obtains the assist instruction value AT.

In S209, the distributor 60 and the overheat protection section 83 obtain the first system temperature T1 and the second system temperature T2.

In S210, it is determined whether the first system temperature T1 or the second system temperature T2 is higher than the overheat determination threshold value Tth. When the first system temperature T1 and the second system temperature T2 are determined to be equal to or less than the overheat determination threshold value Tth (S210:NO), it is determined that the systems are not in the overheat protection required state, and the assist instruction value AT is outputted to the distributor 60, and the process proceeds to S214.

When it is determined that the first system temperature T1 or the second system temperature T2 is higher than the overheat determination threshold value Tth (S210:YES), it is determined that the system is in the overheat protection required state, and the process proceeds to S211.

In S211, the overheat protection restriction value AE is obtained.

In S212, it is determined whether the assist instruction value AT is greater than the overheat protection restriction value AE. When it is determined that the assist instruction value AT is equal to or less than the overheat protection restriction value AE (S212:NO), the assist instruction value AT is outputted to the distributor 60, and the process proceeds to S214. When it is determined that the assist instruction value AT is greater than the overheat protection restriction value AE (S212:YES), the process proceeds to S213.

In S213, the assist instruction value AT is restricted to the overheat protection restriction value AE, and it is outputted to the distributor 60.

The process of S214-S217 is the same as the process of S110-S114 in FIG. 4.

According to the present embodiment, the controller 52 is provided with the overheat protection section 83. The overheat protection section 83 restricts the assist instruction value AT (S213), when it is determined that the system temperature T1 or T2 is in the overheat protection required state (S210:YES in FIG. 6). Thereby, overheating of the motor 20 and inverters 31, 32 is prevented. The same effects as the above-mentioned embodiment are also achieved.

(Third Embodiment)

Figure 7:
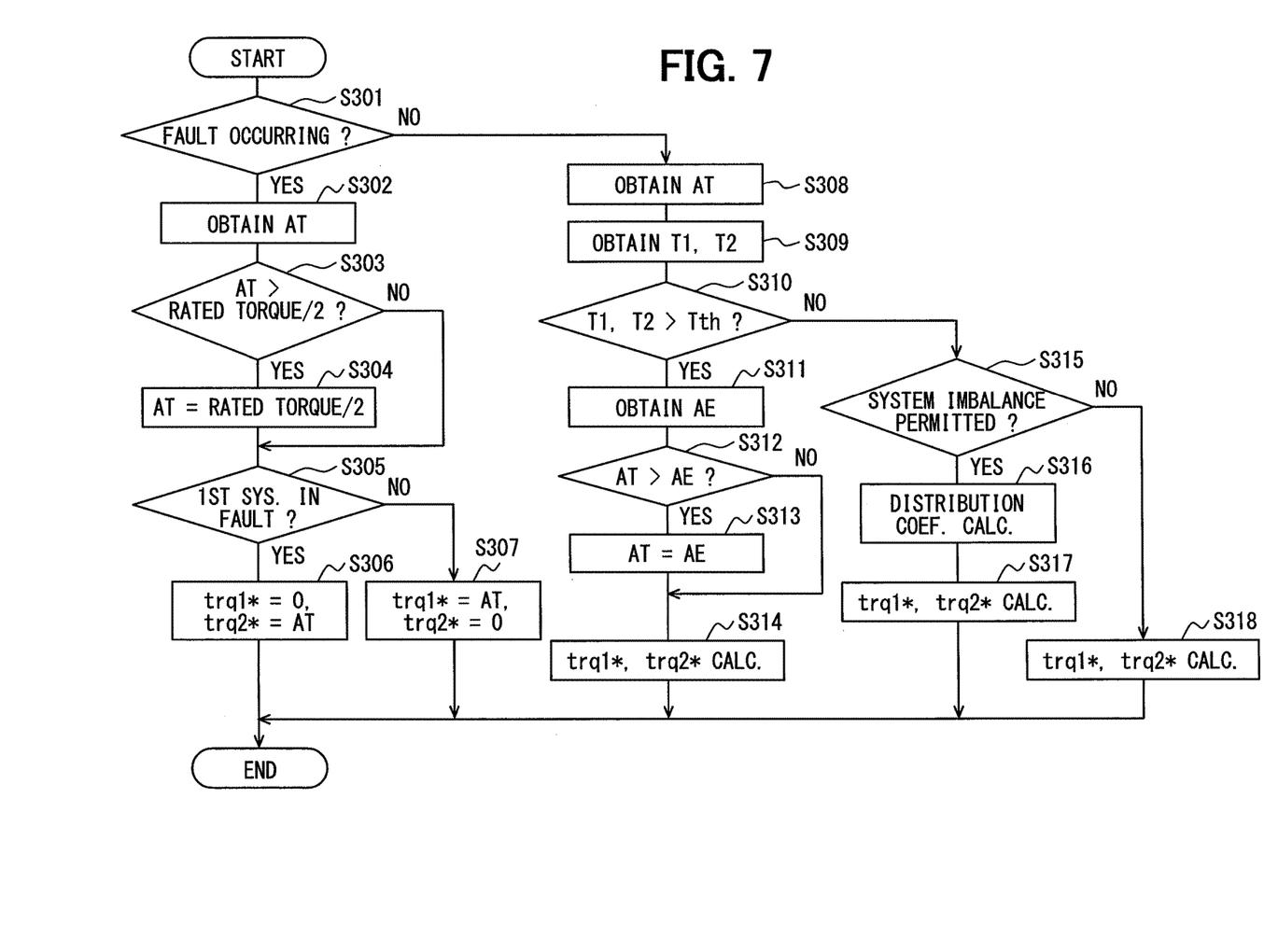
FIG. 7 is a flowchart of the distribution process in the second embodiment of the present disclosure.

The third embodiment of present disclosure is shown in FIG. 7.

Since the distribution process of the present embodiment is different from the second embodiment, the focus of the description in the present embodiment is centered on such difference.

The flowchart of the distribution process in the present embodiment is described based on FIG. 7. In the present embodiment, the process of S308-S313 is a process performed in the overheat protection section 83, and the process other than S310-S313 is a process performed by the distributor 60.

The process of S301-S313 is substantially the same as that of the process of S201-S213 in FIG. 6.

In S314, which comes after S312 or S313, the assist instruction value AT is distributed by a predetermined ratio, and the first system torque instruction value trq1* and the second system torque instruction value trq2* are calculated.

Here, the assist instruction value AT is evenly distributed, and both of the first system torque instruction value trq1* and the second system torque instruction value trq2* are set to one half of the assist instruction value AT. That is, the first system torque instruction value trq1* and the second system torque instruction value trq2* are represented by equations (7-1) and (7-2).

$$trq1*=AT/2 \qquad \text{Equation (7-1)}$$

$$trq2*=AT/2 \qquad \text{Equation (7-2)}$$

The process of S315-S318 is the same as that of S214-S217 in FIG. 6.

According to the present embodiment, as shown in the equations (7-1) and (7-2), the first system temperature T1 or the second system temperature T2 is higher than the overheat determination threshold value Tth, which means that when the overheat protection process is performed, the assist instruction value AT is evenly distributed, and distribution according to the system temperatures T1 and T2 is not performed.

According to the present embodiment, the distributor 60 stops distribution of the assist instruction value AT according to the system temperatures T1 and T2 (S314), when it is determined that the system temperature T1 or T2 is in the overheat protection required state (S310:YES in FIG. 7). That is, in the present embodiment, the system temperature T1 or T2 is higher than the overheat determination threshold value Tth and the assist instruction value AT is restricted, instead of performing a temperature-conscious instruction value distribution according to the system temperatures T1 and T2, a predetermined ratio distribution of the assist instruction value AT is performed.

In such manner, the calculation of the overheat protection is simplified.

Further, the same effects as the above-mentioned embodiment are achieved.

(Fourth Embodiment)

Figure 8:
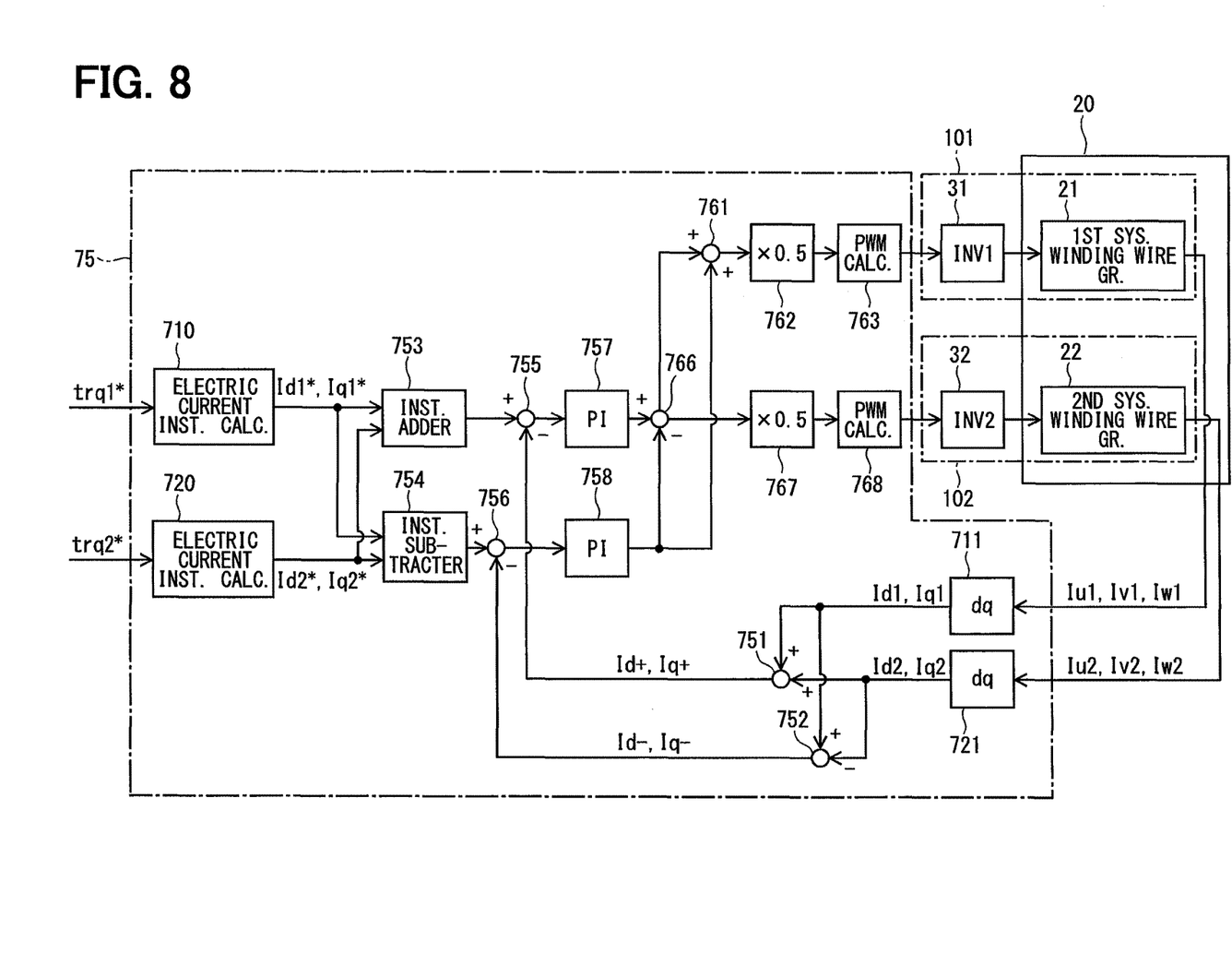
FIG. 8 is a block diagram of the electric current control section in a fourth embodiment of the present disclosure.

The fourth embodiment of the present disclosure is shown in FIG. 8.

According to the present embodiment, an electric current control section 75 differs from the above-mentioned embodiments. The distribution process in the distributor 60 and the like may be the same as any one of the first embodiment to the third embodiment. Further, in the present embodiment, it is assumed that the responsiveness of the electric current control in the first system 101 and the responsiveness of the electric current control in the second system 102 are the same.

The electric current control section 75 has the electric current instruction calculators 710 and 720, the dq converters 711 and 721, an adder 751, a subtracter 752, an instruction adder 753, an instruction subtracter 754, subtracters 755 and 756, PI calculators 757 and 758, an adder 761, a subtracter 766, and converters 762 and 767, and PWM calculators 763 and 768.

The adder 751 adds the d axis electric current detection value Id1 concerning the first system 101 on which the dq conversion is performed by the dq converter 711, and the d axis electric current detection value Id2 concerning the second system 102 on which the dq conversion is performed by the dq converter 721, and calculates a d axis electric current addition value Id+.

The adder 751 adds the q axis electric current detection value Iq1 concerning the first system 101 on which the dq conversion is performed by the dq converter 711, and the q axis electric current detection value Iq2 concerning the second system 102 on which the dq conversion is performed by the dq converter 721, and calculates a q axis electric current addition value Iq+.

The subtracter 752 subtracts the d axis electric current detection value Id2 of the second system 102 from the d axis electric current detection value Id1 of the first system 101, and calculates a d axis electric current subtraction value Id−.

The subtracter 752 subtracts the q axis electric current detection value Iq2 of the second system 102 from the q axis electric current detection value Iq1 of the first system 101, and calculates a q axis electric current subtraction value Iq−.

The instruction adder 753 adds the d axis electric current instruction value Id1* of the first system 101 and the d axis electric current instruction value Id2* of the second system 102, and calculates a d axis addition electric current instruction value Id+*.

The instruction adder 753 adds the q axis electric current instruction value Iq1* of the first system 101 and the q axis electric current instruction value Iq2* of the second system 102, and calculates a q axis addition electric current instruction value Iq+*.

The instruction subtracter 754 subtracts the d axis electric current instruction value Id2* of the second system 102 from the d axis electric current instruction value Id1* of the first system 101, and calculates a d axis subtraction electric current instruction value Id−*.

The instruction subtracter 754 subtracts the q axis electric current instruction value Iq2* of the second system 102 from the q axis electric current instruction value Iq1* of the first system 101, and calculates a q axis subtraction electric current instruction value Iq−*.

The subtracter 755 calculates a d axis addition electric current deviation ΔId+, which is a deviation of the d axis addition electric current instruction value Id+* from the d axis electric current addition value Id+.

The subtracter 755 calculates a q axis addition electric current deviation ΔIq+, which is a deviation of the q axis addition electric current instruction value Iq+* from the q axis electric current addition value Iq+.

The subtracter 756 calculates a d axis subtraction electric current deviation ΔId−, which is a deviation of the d axis subtraction electric current instruction value Id−* from the d axis electric current subtraction value Id−.

The subtracter 756 calculates a q axis subtraction current deviation ΔIq− which is a deviation of the q axis subtraction electric current instruction value Iq−* from the q axis electric current subtraction value Iq−.

The PI calculator 757 calculates addition voltage instruction values Vd+* and Vq+* by the PI calculation etc., so that the addition electric current deviations ΔId+ and ΔIq+ respectively converge to zero.

The PI calculator 758 calculates subtraction voltage instruction values Vd−* and Vq−* by the PI calculation etc., so that the subtraction current deviation ΔId− and ΔIq− respectively converge to zero.

The adder 761 adds the added voltage instruction value Vd+* and subtraction voltage instruction value Vd−* about a d axis to calculate a pre-conversion first system voltage instruction value Vd1*_b, and adds the added voltage instruction value Vq+* and the subtraction voltage instruction value Vq−* about a q axis to calculate a pre-conversion first system voltage instruction value Vq1*_b.

In the converter 762, the pre-conversion first system voltage instruction values Vd1*_b and Vq1*_b are multiplied by a scaling factor 0.5, for the calculation of first system voltage instruction values Vd1* and Vq1*. Further, the calculated voltage instruction values Vd1* and Vq1* are converted to the voltage instruction values Vu1*, Vv1*, and Vw1* in three phases.

Just like the PWM calculator 714 in FIG. 4, the PWM calculator 763 compares the voltage instruction values Vu1*, Vv1*, and Vw1* with a carrier wave, and generates a control signal that controls the switching ON and OFF of the switching elements 311-316.

The subtracter 766 subtracts the subtraction voltage instruction value Vd−* from the addition voltage instruction value Vd+* about the d axis to calculate the pre-conversion second system voltage instruction value Vd2*_b, and subtracts the subtraction voltage instruction value Vq−* from the added voltage instruction value Vq+* to about the q axis to calculate the pre-conversion second system voltage instruction value Vq2*_b.

In the converter 767, the pre-conversion second system voltage instruction values Vd2*_b and Vq2*_b are multiplied by a scaling factor 0.5, for the calculation of the second system voltage instruction values Vd2* and Vq2*. Further, the calculated voltage instruction values Vd2* and Vq2* are converted to the voltage instruction values Vu2*, Vv2*, and Vw2* in three phases.

Just like the PWM calculator 724 in FIG. 4, the PWM calculator 768 compares the voltage instruction values Vu2*, Vv2*, and Vw2* with a carrier wave, and generates a control signal that controls the switching ON and OFF of the switching elements 321-326.

In the electric current control section 75, a non-interference control that reduces interference between the two systems may be performed, just like the first embodiment.

According to the present embodiment, addition and subtraction are performed for the appropriate electric current control. In such manner, the influence of the temperature change, and the variation of characteristics among individual electric components and elements etc., are reduced.

Further, the same effects as the above-mentioned embodiment are also achievable.

(Other Embodiments)

(a) The Number of the Systems

In the above-mentioned embodiments, the number of the systems is two.

In other embodiments, the number of the systems may be three or more. That is, the number of winding wire groups may be three or more, and the inverter may be provided in a corresponding manner to each of the winding wire groups.

(b) The Distributor

In the above-mentioned embodiments, the distribution of the instruction value is performed based on the system temperature itself.

In other embodiments, an operation-guaranteed temperature, or a maximum heat-resistant temperature that is the highest temperature threshold where the system may operate, may be predetermined, and the distribution of the instruction value may be performed according to a difference between the operation-guaranteed temperature and the system temperature. That is, when the difference between the operation-guaranteed temperature and the system temperature is small in one system, the distribution coefficient for such system may be controlled to be relatively small compared with the coefficient for the other systems. Further, when the temperature is detected/estimated at plural positions in each of the systems, the distribution of the instruction value may preferably be performed according to the smallest difference between the operation-guaranteed temperature and the system temperature from one of the plural positions.

Further, in case that the overheat protection control is performed based on the above-described difference, the system temperature is determined to be in the overheat protection required state when the difference is smaller than a determination threshold, and the similar process as the second or third embodiment may be performed.

In such manner, the instruction value may be appropriately distributed for the avoidance of overheating (i.e., for the system temperature to stay under the operation-guaranteed temperature).

(c) The Rotating Electric Machine

The rotating electric machine may not only be a motor (i.e., an electric motor) but may also be a generator, or may also be a motor-generator that serves as both of a motor and a generator.

Further, the rotating electric machine used in an electric power steering system in the above-mentioned embodiment may also be used in other system or device other than the electric power steering system in other embodiments.

Although the present disclosure has been described in connection with preferred embodiment thereof with reference to the accompanying drawings, it is to be noted that various changes and modifications will become apparent to those skilled in the art, and such changes, modifications, and summarized scheme are to be understood as being within the scope of the present disclosure as defined by appended claims.

What is claimed is:

1. A controller for controlling a rotating electric machine that has a plurality of winding wire groups, the controller comprising:
    an instruction calculator calculating an instruction value regarding a drive of the rotating electric machine;
    a temperature calculator calculating a system temperature for each of a plurality of systems, each of the plurality of systems having a one-to-one combination of one winding wire group and one inverter;
    a distributor calculating, for each of the winding wire groups, a distributed instruction value by distributing the instruction value calculated by the instruction calculator according to the system temperature; and
    an electric current control section controlling an electric current flowing in each of the winding wire groups based on the distributed instruction value.

2. The controller of claim 1 further comprising:
an overheat protection section restricting the instruction value when the system temperature is determined to be in an overheat protection required state.

3. The controller of claim 2, wherein
the distributor stops the distribution of the instruction value according to the system temperature when the system temperature is determined to be in the overheat protection required state.

4. The controller of claim 1, wherein
the system temperature is either a highest one or an averaged one of temperature measurements at a plurality of temperature measurement points in the one winding wire group and the one inverter.

5. The controller of claim 1, wherein
the distributor distributes the instruction value to each of the winding wire groups according to a difference between an operation-guaranteed temperature and the system temperature.

6. The controller of claim 1, wherein
the calculating of the distributed instruction value includes calculating a distribution coefficient for each of the winding wire groups based on the system temperature, and applying the distribution coefficient to the instruction value.

7. The controller of claim 6, wherein
for a rotating electric machine comprising a first winding wire group having a first system temperature and a second winding wire group having a second system temperature,
a first distribution coefficient is equal to the temperature of the second winding wire group divided by the sum of the temperature of the first winding wire group and the temperature of the second winding wire group, and
a second distribution coefficient is equal to the temperature of the first winding wire group divided by the sum of the temperature of the first winding wire group and the temperature of the second winding wire group.

8. The controller of claim 7, wherein
a first distributed instruction value for the first winding wire group is equal to the instruction value multiplied by the first distribution coefficient, and
a second distributed instruction value for the second winding wire group is equal to the instruction value multiplied by the second distribution coefficient.

9. The controller of claim 1, wherein
the electric current control section controls the electric current, based on the distributed instruction value, before overheating occurs.

* * * * *

UNITED STATES PATENT AND TRADEMARK OFFICE
CERTIFICATE OF CORRECTION

Page 1 of 1

PATENT NO. : 9,692,343 B2
APPLICATION NO. : 15/043166
DATED : June 27, 2017
INVENTOR(S) : Shuji Kuramitsu It is certified that error appears in the above-identified patent and that said Letters Patent is hereby corrected as shown below:

In Column 9 at Line 1, Change "trq1*=" to --trq1*=0--.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*